United States Patent [19]

Horikawa

[11] Patent Number: 4,590,369

[45] Date of Patent: May 20, 1986

[54] METHOD OF DETECTING SENSITIVITIES OF PHOTOMULTIPLIERS

[75] Inventor: Kazuo Horikawa, Kanagawa, Japan

[73] Assignee: Fuji Photo Film Co., Ltd., Kanagawa, Japan

[21] Appl. No.: 541,634

[22] Filed: Oct. 13, 1983

[30] Foreign Application Priority Data

Oct. 13, 1982 [JP] Japan ................................ 57-179249

[51] Int. Cl.$^4$ .............................................. G05B 1/02
[52] U.S. Cl. ............................ 250/252.1; 250/327.2; 250/363 S
[58] Field of Search .................. 250/252.1, 327.2, 366, 250/369, 363 SG

[56] References Cited

U.S. PATENT DOCUMENTS

| | | | |
|---|---|---|---|
| 3,721,824 | 3/1973 | Bristol | 250/369 |
| 4,228,515 | 10/1980 | Genna et al. | 364/571 |
| 4,258,264 | 3/1981 | Kotera et al. | 250/484.1 |
| 4,346,295 | 8/1982 | Tanaka et al. | 250/327.2 |
| 4,498,006 | 2/1985 | Horikawa et al. | 250/327.2 |
| 4,527,060 | 7/1985 | Suzuki et al. | 250/327.2 |

Primary Examiner—Alfred E. Smith
Assistant Examiner—Constantine Hannaher
Attorney, Agent, or Firm—Sughrue, Mion, Zinn, Macpeak and Seas

[57] ABSTRACT

In a system provided with a plurality of photomultipliers, the sensitivities of the photomultipliers relative to one another are detected by comparing the outputs of the photomultipliers generated under irradiation by light emitted from the same light source. The difference between the detected sensitivities relative to one another and predetermined sensitivities relative to one another is calculated, and the sensitivities of the respective photomultipliers are corrected so that the difference becomes zero.

7 Claims, 1 Drawing Figure

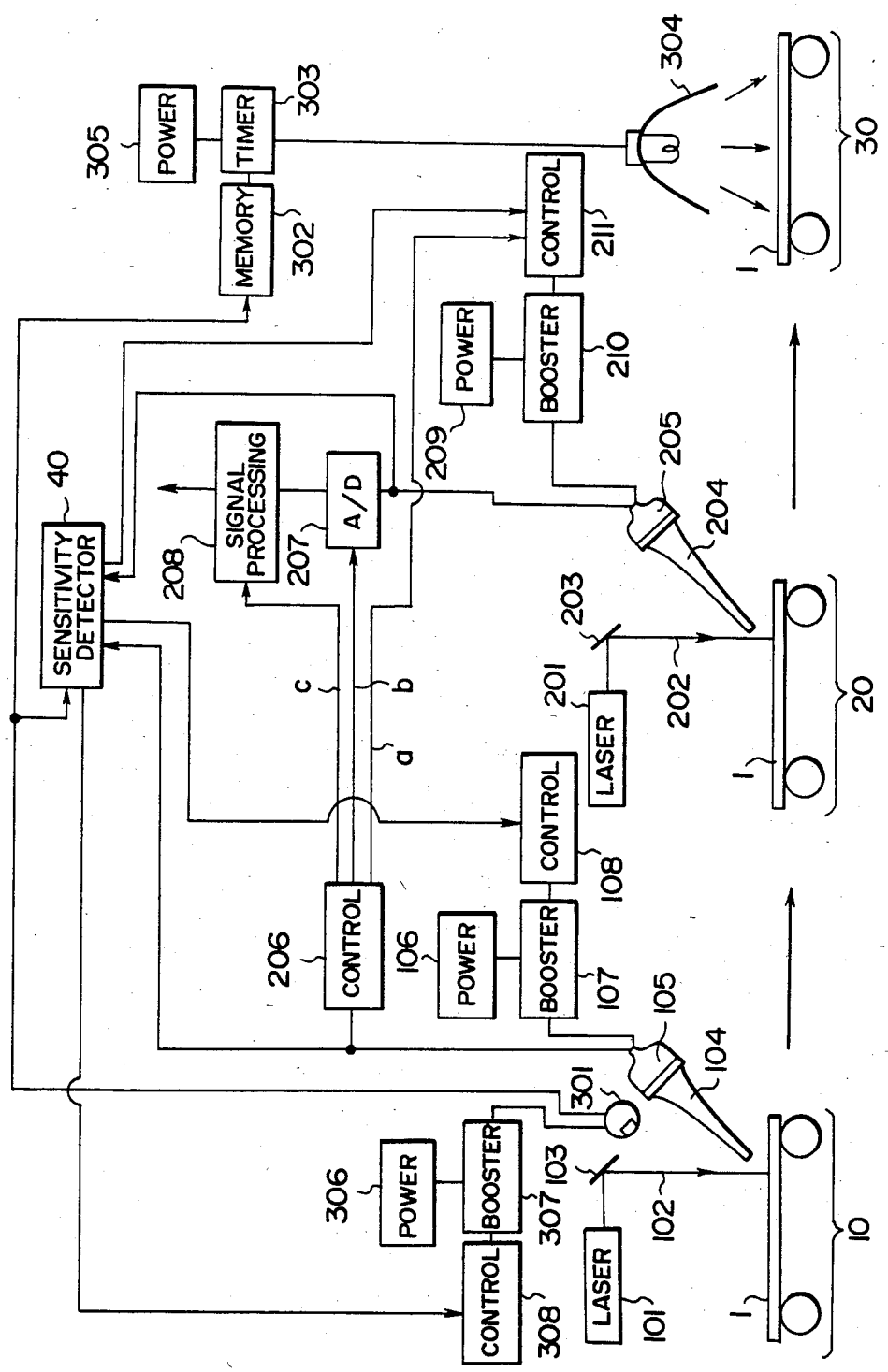

METHOD OF DETECTING SENSITIVITIES OF PHOTOMULTIPLIERS

BACKGROUND OF THE INVENTION

1. Field of the Invention

This invention relates to a method of detecting the sensitivities of photomultipliers.

2. Description of the Prior Art

Photomultipliers are suitable for detecting very weak light and are widely used as a light detector, for example, in image read-out systems wherein an image recorded on a sheet is read out by two-dimensionally scanning the sheet with a light beam such as a laser beam, and detecting the light (for example, reflected light or transmitted light) carrying the image information obtained by the scanning.

Such an image read-out method using photomultipliers as described above is employed, for example, in a radiation image recording and reproducing system using a stimulable phosphor sheet. The radiation image recording and reproducing system is disclosed, for example, in U.S. Pat. No. 4,258,264 and Japanese Unexamined Patent Publication No. 56(1981)-11395. In this system, a stimulable phosphor sheet carrying a radiation image stored therein is exposed to stimulating rays which cause the stimulable phosphor sheet to emit light in the pattern of the stored image, and the emitted light is detected by use of photomultipliers.

The term "stimulable phosphor" as used herein means such a phosphor that when exposed to a radiation such as X-rays, α-rays, β-rays, γ-rays, or ultraviolet rays, or the like, it absorbs and stores a part of the energy of the radiation and emits light in proportion to the stored energy when excited with stimulating rays such as visible light and infrared rays after exposure to the radiation.

In the aforesaid radiation image recording and reproducing system using a stimulable phosphor, image read-out is conducted as described below. Namely, a stimulable phosphor sheet is first exposed to a radiation such as X-rays passing through an object such as a human body to have a radiation image stored therein, and is then two-dimensionally scanned with stimulating rays such as a laser beam which cause the stimulable phosphor sheet to emit light in the pattern of the stored image. The light emitted from the stimulable phosphor sheet upon stimulation thereof is photoelectrically detected by use of photomultipliers and converted to an electric image signal, which is processed as desired to reproduce a visible image on a recording medium such as a photographic light-sensitive material or on a display device such as a cathode ray tube (CRT).

In the radiation image recording and reproducing system as described above, particularly in the radiation image recording and reproducing system using a plurality of photomultipliers, in order to assure normal operation of the system, it is necessary that at least the sensitivities of the respective photomultipliers relative to one another always be set to a predetermined value.

However, the sensitivity of a photomultiplier changes (deteriorates) with the lapse of time. Also, it changes according to the change of ambient temperature. When the sensitivity is changed, it becomes impossible to read out the light carrying the image information accurately. Particularly in the system using a plurality of photomultipliers, when the sensitivities of the respective photomultipliers relative to one another deviates from a predetermined value, the system cannot work normally. A change in the sensitivities of many photomultipliers relative to one another presents a very real problem particularly in the aforesaid radiation image recording and reproducing system using a stimulable phosphor sheet.

It has been proposed in U.S. patent application Ser. No. 434,886, now U.S. Pat. No. 4,527,060 (European patent application Ser. No. 82305530.6) to conduct, in the radiation image recording and reproducing system, a read-out operation for detecting the image input information of a radiation image stored in a stimulable phosphor by use of stimulating rays having stimulation energy lower than the stimulation energy of stimulating rays used in a read-out operation for obtaining a visible image for viewing, particularly for diagnostic purposes, and thereafter to conduct the read-out operation for obtaining a visible image for viewing, that is, the final read-out. The above-mentioned read-out operation conducted before the final read-out operation is hereinbelow referred as "preliminary read-out".

In the final read-out, the read-out gain is adjusted, and/or the scale factor is determined, and/or the image processing conditions are determined appropriately based on the image input information obtained by the preliminary read-out, thereby to obtain a radiation image free from fluctuations in the radiographic exposure conditions and suitable for viewing, particularly for diagnostic purposes. The read-out gain and the scale factor are together referred to as the read-out conditions. In this case, the image input information obtained by the preliminary read-out must be sufficiently accurate to reliably determine the read-out conditions in the final read-out and/or the image processing conditions. To accomplish this, it is necessary that the sensitivity of the photomultiplier used in the preliminary read-out and the sensitivity of the photomultiplier used in the final read-out be strictly adjusted at least relative to each other.

Further, it has been proposed in Japanese patent application No. 56(1981)-179287 to measure the level of the radiation energy remaining in a stimulable phosphor sheet after a radiation image stored in the stimulable phosphor is read out, and to control the amount of light irradiated to the stimulable phosphor sheet for erasing noise according to the measured level of the residual radiation energy. In this case, noise erasing cannot be conducted securely if the sensitivity of the photomultiplier changes.

As described above, in a system provided with a plurality of photomultipliers, if the sensitivities of the respective photomultipliers relative to one another deteriorate with time or change due to a change in the ambient temperature, the whole system is prevented from working normally. Therefore, it is necessary to always maintain the sensitivities of the respective photomultipliers relative to one another at a predetermined value.

SUMMARY OF THE INVENTION

The primary object of the present invention is to provide a method of detecting the sensitivities of a plurality of photomultipliers relative to one another so as to maintain the sensitivities of the respective photomultipliers relative to one another at a predetermined value in a system provided with a plurality of photomultipliers.

Another object of the present invention is to provide a method of detecting the sensitivities of the respective photomultipliers relative to one another, and then correcting the sensitivities to maintain the sensitivities of the respective photomultipliers relative to one another at a predetermined value.

The method of detecting the sensitivities of photomultipliers comprises the steps of measuring the outputs of a plurality of photomultipliers generated upon irradiation by light emitted from the same light source, detecting the sensitivities of the respective photomultipliers relative to one another by comparing the measured outputs with one another, and detecting the sensitivities of the photomultipliers based on the detected sensitivities relative to one another. The present invention is also characterized by calculating the difference between the detected sensitivities relative to one another and the predetermined sensitivities relative to one another, and correcting the sensitivities of the respective photomultipliers so that said difference becomes zero. When the sensitivity of one photomultiplier among a plurality of photomultipliers has deteriorated to such an extent that it cannot be corrected, the deteriorated photomultiplier is replaced with a new one, and the sensitivities of the plurality of photomultipliers relative to one another are adjusted to a predetermined value.

In the present invention, the system provided with a plurality of photomultipliers embraces any system using many photomultipliers, for example, an image read-out system such as the aforesaid radiation image recording and reproducing system, a light amount measuring apparatus, or the like.

As the aforesaid light source, any light source can be used insofar as it emits light capable of being detected by photomultipliers. For example, in the radiation image recording and reproducing system, it is possible to use a stimulable phosphor sheet carrying radiation energy stored therein as the light source. Further, the amounts of light emitted to the respective photomultipliers need not necessarily be the same, and may be different from one another insofar as the amounts of light emitted to the photomultipliers relative to one another are known.

The correction of the sensitivities of the photomultipliers should preferably be carried out by adjusting the voltages applied to the photomultipliers.

When the method of the present invention is used, for example, in the aforesaid radiation image recording and reproducing system, it becomes possible to accurately adjust the sensitivity of the photomultiplier which is used in the preliminary read-out for detecting the image input information stored in a stimulable phosphor sheet, relative to the sensitivity of the photomultiplier which is used in the final read-out for obtaining a visible image for viewing, particularly for diagnostic purposes, to a predetermined value. Accordingly, it is possible to obtain a radiation image suitable for viewing, particularly for diagnostic purposes. Further, it becomes possible to reliably erase the radiation energy remaining in the stimulable phosphor sheet after the image read-out step is conducted.

BRIEF DESCRIPTION OF THE DRAWING

The single drawing is a block diagram showing the whole system wherein an embodiment of the sensitivity detecting method in accordance with the present invention is employed.

DESCRIPTION OF THE PREFERRED EMBODIMENT

The present invention will hereinbelow be described in further detail with reference to the accompanying drawing.

The accompanying drawing shows the whole radiation image recording and reproducing system using a stimulable phosphor sheet, wherein an embodiment of the method in accordance with the present invention is employed.

The radiation image system comprises a preliminary read-out section 10, a final read-out section 20, and a residual radiation energy erasing section 30.

In the radiation image system, the read-out of a radiation image stored in a stimulable phosphor sheet and the erasing of the radiation energy remaining in the stimulable phosphor sheet after the read-out are conducted as described below.

A stimulable phosphor sheet 1 carrying a radiation image stored therein is first sent to the preliminary read-out section 10, and the preliminary read-out for detecting the image input information of the radiation image is conducted as described below. A laser beam 102 emitted from a laser beam source 101 for preliminary read-out is one-dimensionally deflected by a light deflector 103 such as a galvanometer mirror and directed onto the stimulable phosphor sheet 1. The laser beam source 101 is selected so that the laser beam 102 emitted therefrom has a wavelength distribution different from and far apart from the wavelength distribution of the light emitted from the stimulable phosphor sheet 1 upon stimulation thereof. While the laser beam 102 impinges upon the stimulable phosphor sheet 1, the phosphor sheet 1 is moved rightwardly in the drawing (sub-scanning direction) and, consequently, the whole area of the phosphor sheet 1 is exposed to and two-dimensionally scanned with the laser beam 102. The power of the laser beam source 101, the beam diameter of the laser beam 102, the scanning speed of the laser beam 102, and the moving speed of the phosphor sheet 1 are selected so that the stimulation energy of the laser beam 102 for preliminary read-out per unit area of the phosphor sheet 1 is smaller than the stimulation energy of the laser beam for final read-out per unit area. When exposed to the laser beam 102, the stimulable phosphor sheet 1 emits light in proportion to the radiation energy stored therein, and the emitted light enters a light guiding sheet 104 for preliminary read-out. The light guiding sheet 104 has a linear light input face positioned close to the scanning line on the stimulable phosphor sheet 1, and a ring-shaped light output face in close contact with the light receiving face of a photomultiplier 105. The light guiding sheet 104 is made of a transparent thermoplastic resin sheet such as an acrylic resin sheet so that the light entering from the light input face can be transmitted to the light output face by total reflection through the interior of the light guiding sheet 104. The light emitted from the stimulable phosphor sheet 1 upon stimulation thereof is guided in the interior of the light guiding sheet 104, emitted from the light output face of the light guiding sheet 104, and received by the photomultiplier 105. The light guiding sheet 104 may be of a shape and a material as disclosed in U.S. Pat. No. 4,346,295.

The light receiving face of the photomultiplier 105 is provided with a filter for transmitting only the light having the wavelength distribution of the light emitted from the stimulable phosphor sheet 1 and cutting off the light having the wavelength distribution of the stimulating rays, so that the photomultiplier 105 can detect only the light emitted from the stimulable phosphor sheet 1 upon stimulation thereof. The image input information of the radiation image outputted from the photomultiplier 105 is sent to a control circuit 206 of the final read-out section 20. On the basis of the image input information thus obtained, the control circuit 206 generates an amplification degree setting value (a), a scale factor setting value (b) and an image processing condition setting value (c). Simultaneously with the preliminary read-out, the level of the radiation energy stored in the stimulable phosphor sheet 1 is measured. This measurement is conducted by detecting the maximum level of the radiation energy stored in the stimulable phosphor sheet 1 by use of a side window type photomultiplier 301. The maximum level thus measured is stored in a memory 302 of the residual radiation energy erasing section 30. When the preliminary read-out is finished as described above, the stimulable phosphor sheet 1 is sent to the final read-out section 20.

In the final read-out section 20, a laser beam 202 emitted from a laser beam source 201 for final read-out is deflected by a light deflector 203 such as a galvanometer mirror and directed onto the stimulable phosphor sheet 1. While the laser beam 202 impinges upon the stimulable phosphor sheet 1, the phosphor sheet 1 is moved rightwardly in the drawing (subscanning direction) and, consequently, the whole area of the phospor sheet 1 is exposed to and two-dimensionally scanned with the laser beam 202. When exposed to the laser beam 202, the stimulable phosphor sheet 1 emits light in proportion to the radiation energy stored therein, and the emitted light enters a light guiding sheet 204 which is made of the same material and has the same construction as the light guiding sheet 104 used for the preliminary read-out. The light emitted from the stimulable phosphor sheet 1 is guided in the interior of the light guiding sheet 204 through total reflection, emitted from the light output face of the light guiding sheet 204, and received by a photomultiplier 205. The light receiving face of the photomultiplier 205 is closely contacted with a filter for selectively transmitting only the light having the wavelength distribution of the light emitted from the stimulable phosphor sheet 1, so that the photomultiplier 205 can detect only the light emitted therefrom. Since a controller 211 for controlling a booster 210 positioned at the stage next to a power source 209 is controlled according to the amplification degree setting value (a) so as to adjust the sensitivity of the photomultiplier 205, the output of the photomultiplier 205 is converted to an electric signal of an adequate level. The electric signal is then sent to an A/D converter 207, wherein the electric signal is converted to a digital signal with a scale factor which has been set by the scale factor setting value (b) suitable for the width of signal fluctuation. The digital signal thus obtained is sent to a signal processing circuit 208, in which it is processed based on the image processing condition setting value (c) so as to obtain a radiation image suitable for viewing, particularly for diagnostic purposes. The output obtained from the signal processing circuit 208 is used for reproducing a visible image.

When the image read-out is finished as described above, the stimulable phosphor sheet 1 is sent to the residual radiation energy erasing section 30 and positioned below a noise erasing light source 304. A timer 303 positioned at the stage next to a power source 305 is turned on for a time corresponding to the value stored in the memory 302, thereby to emit erasing light from the noise erasing light source 304. In this manner, the radiation energy remaining in the stimulable phosphor sheet 1 is erased efficiently.

In the radiation image system as described above, detection and correction of the sensitivities of the photomultipliers are conducted by the method of the present invention as described below.

The stimulable phosphor sheet 1 is first uniformly exposed to a radiation. Then, the preliminary read-out and the final read-out are conducted as described above. At this time, the values outputted from the photomultipliers 105, 205 and 301 are forwarded to a sensitivity detector 40. The sensitivity detector 40 compares the outputs sent from the photomultipliers 105, 205 and 301 with one another, and detects the sensitivities of the photomultipliers 105, 205 and 301 relative to one another. The sensitivity detector 40 calculates the difference between the detected sensitivities relative to one another and the predetermined sensitivities relative to one another, and generates a control signal for adjusting the difference to zero. The controllers 108, 211 and 308 for controlling the boosters 107, 210 and 307 positioned at the stages next to the power sources 106, 209 and 306 for the photomultipliers 105, 205 and 301, respectively, are controlled by the control signal generated by the sensitivity detector 40 so as to adjust the voltages applied to the photomultipliers 105, 205 and 301. In this manner, the sensitivities of the photomultipliers 105, 205 and 301 relative to one another are adjusted to the predetermined sensitivities relative to one another. When the sensitivities of the photomultipliers 105, 205 and 301 relative to one another are corrected as described above, it becomes possible to obtain image input information suitable for the final read-out by the preliminary read-out and to obtain a visible image suitable for viewing, particularly for diagnostic purposes. Further, it becomes possible to reliably erase the radiation energy remaining in the stimulable phosphor sheet 1 after the read-out step. When it is detected that the photomultiplier has deteriorated to such an extent as to make it impossible to correct the sensitivity, the deteriorated photomultiplier is replaced with new one.

In the embodiment described above, the stimulable phosphor sheet uniformly exposed to a radiation is used for detecting the sensitivities of the photomultipliers. However, it is also possible to use a stimulable phosphor sheet carrying a radiation image of an object stored therein, and to detect the sensitivities of the photomultipliers during the steps of reading out the radiation image from the phosphor sheet and erasing the radiation energy remaining therein. Further, a light source such as a lamp may be used instead of the stimulable phosphor sheet.

The method of the present invention is suitable not only for the radiation image recording and reproducing systems but also for any other system wherein a plurality of photomultipliers are used.

I claim:

1. A method of detecting and adjusting the sensitivities of a plurality of photomultipliers relative to one another in a radiation image recording and reproducing system employing a stimulable phosphor sheet carrying a radiation image stored therein, wherein the photomultipliers are arranged sequentially in a preliminary and a secondary stage, comprising the steps of; sequentially irradiating said photomultipliers to light emitted from the same light source, comparing the outputs of said photomultipliers generated under said irradiation, said stimulable phosphor sheet carrying a radiation image stored therein exposed to stimulating rays which cause the stimulable phosphor sheet to emit light in proportion to the radiation energy stored therein, reading out the emitted light photoelectrically and converted it to an electric signal, reproducing the radiation image into a visible image based on the obtained electric signal; and wherein the plurality of said photomultipliers comprises a photomultipliers used for preliminary read-out for detecting in advance the image input information stored in said stimulable phosphor sheet, and a photomultiplier used for final read-out for obtaining said visible for viewing purposes.

2. The method of claim 1 further comprising the step of detecting the level of radiation energy remaining in said stimulable phosphor sheet after the step of read-out is conducted.

3. The method of claim 2 further comprising the step of exposing said stimulable phosphor sheet to a noise erasing light source for a duration of time proportional to the remaining radiation energy.

4. The method of claim 2, wherein a photomultiplier is employed to detect the level of radiation remaining in said stimulable phosphor sheet.

5. A method of detecting and adjusting the sensitivities of photomultipliers relative to one another in a radiation image recording and reproduction system using a stimulable phosphor sheet carrying a radiation image stored therein; wherein the photomultipliers are arranged sequentially in a preliminary and a secondary stage comprising the steps of; sequentially irradiating said photomultipliers to light emitted from the same light source, comparing the outputs corresponding to said sensitivities of said photomultipliers generated under said irradiation, calculating the difference between the detected sensitivities relative to one another and predetermined sensitivities relative to one another, and correcting the sensitivities of the respective photomultipliers so that said difference becomes zero, said stimulable phosphor sheet carrying a radiation image stored therein exposed to stimulating rays which cause the stimulable phosphor sheet to emit light in proportion to the radiation energy stored therein, reading out the emitted light photoelectrically and converting it to an electric signal, reproducing the radiation image into a visible image based on the obtained electric signal; and wherein the plurality of said photomultipliers comprises a photomultiplier used for preliminary read-out for detecting in advance the image input information stored in said stimulable phosphor sheet, and, a photomultiplier used for final read-out for obtaining said visible image for viewing purposes.

6. A method as defined in claim 5 wherein said correction of the sensitivities of the respective photomultipliers is conducted by adjusting the voltages applied to the respective photomultipliers.

7. A method as defined in claim 5 wherein said plurality of said photomultipliers comprises a photomultiplier used for detecting the level of the radiation energy remaining in said stimulable phosphor sheet after the image read-out is conducted, wherein said stimulable phosphor sheet is exposed to a noise erasing light source for a time duration proportional to said remaining radiation energy.

* * * * *